(12) United States Patent
Takemura et al.

(10) Patent No.: US 7,884,969 B2
(45) Date of Patent: Feb. 8, 2011

(54) IMAGE PROCESSING APPARATUS, PRINTING APPARATUS AND IMAGE PROCESSING METHOD

(75) Inventors: Hideki Takemura, Tokyo (JP); Shigeru Fujita, Yokohama (JP); Hiroki Horikoshi, Kawasaki (JP); Akira Ichimura, Tokyo (JP); Takeshi Kuga, Inagi (JP); Hiroyuki Hosogoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 572 days.

(21) Appl. No.: 11/949,385

(22) Filed: Dec. 3, 2007

(65) Prior Publication Data

US 2008/0285084 A1  Nov. 20, 2008

(30) Foreign Application Priority Data

Dec. 7, 2006  (JP) .............................. 2006-331000

(51) Int. Cl.
*G06K 15/00* (2006.01)
*G06K 9/00* (2006.01)
*H04N 1/407* (2006.01)
*H04N 1/46* (2006.01)

(52) U.S. Cl. ................... 358/3.03; 358/3.26; 358/539; 382/251

(58) Field of Classification Search ................ 358/3.03, 358/426, 427, 430, 539, 3.26, 3.27, 3.01, 358/3.08, 3.21; 382/232, 238, 239, 246, 382/237, 251, 233; 348/207, 231, 390, 394, 348/400, 405, 410
See application file for complete search history.

(56) References Cited

U.S. PATENT DOCUMENTS

| 5,931,960 | A  |   | 8/1999  | Kletter et al. ................ 714/704 |
| 6,009,201 | A  | * | 12/1999 | Acharya ..................... 382/232 |
| 7,643,180 | B2 | * | 1/2010  | Yamanaka et al. .......... 358/3.26 |

FOREIGN PATENT DOCUMENTS

| JP | 4-35164     | 2/1992  |
| JP | 11-243490   | 9/1999  |
| JP | 2001-285633 | 10/2001 |
| JP | 2006-211351 | 8/2006  |

OTHER PUBLICATIONS

Korean Official Notice of Rejection dated May 20, 2009, regarding Application No. 10-2007-0126464 (English translation attached).

* cited by examiner

*Primary Examiner*—Charlotte M Baker
(74) *Attorney, Agent, or Firm*—Fitzpatrick, Cella, Harper & Scinto

(57) ABSTRACT

An image processing apparatus, a printing apparatus and an image processing method are provided which can perform quantization processing on image data at high speed based on an error diffusion method while at the same time avoiding degradations in a quality of printed images. When an error value represented by error data is a particular value, the error data is converted into compressed error data with a data volume less than that of the original error data.

12 Claims, 12 Drawing Sheets

IMAGE PROCESSING APPARATUS, PRINTING APPARATUS AND IMAGE PROCESSING METHOD

BACKGROUND OF THE INVENTION

1. Field of the Invention

The present invention relates to an image processing apparatus, a printing apparatus and an image processing method capable of performing at high speed an image data quantization using an error diffusion method.

2. Description of the Related Art

With rapid advances and development of integrated circuit fabrication technologies and information communication technologies under way, information devices, such as personal computers and digital cameras, have come into wide use in offices and homes and their performances have significantly improved. As these information devices spread, demands for the printing apparatus as output devices are steadily increasing. Especially, an ink jet printing apparatus that prints images using droplets of a plurality of color inks are currently being used in a wide range of industrial fields and also in homes. Recent years have seen significant advances in ink jet printing technologies, which in turn has resulted in development of printing apparatus capable of outputting highly defined color images, such as color photographs, and ones capable of printing on large-size print media with a width as large as A0 or B0.

An ink jet printing apparatus forms an image by ejecting fine droplets of different color inks from a large number of fine openings (ejection openings constituting nozzles) formed in a print head. In a so-called serial scan type ink jet printing apparatus, the image forming on a print medium involves reciprocally moving the print head in a main scan direction at a position facing the print medium and moving the print medium in a direction crossing the main scan direction. A plurality of nozzles are arrayed in a direction crossing the main scan direction to form a nozzle array. Ink tanks amounted in the printing apparatus contain various color inks, which are supplied to the print head for ejection from the nozzles.

Image data for each ink color handled by the ink jet printing apparatus is binary data that indicates whether or not an ink droplet should be ejected for each pixel. On the other hand, image data for each ink color handled by a host device such as a computer, that instructs the printing apparatus to perform printing, is greater gradation image date. For example, the greater gradation image data is 8- or 10-bit data representing 256 or 1024 gradation values. Thus, for the ink jet printing apparatus to perform printing, the greater gradation image data needs to be converted into binary image data. In other words, quantization processing must be done.

Widely known quantization processing includes an error diffusion method and a dither method. The error diffusion method compares, for each pixel, a pixel value and a threshold and distributes quantization errors caused by the quantization processing to unprocessed neighboring pixels. Since it also saves the densities of an entire image during the quantization processing, the error diffusion method is capable of good pseudo-gradation representation.

In an ink jet printing apparatus of a serial scan type, when the error diffusion-based quantization processing is performed on image data, one line of pixels to be printed by the print head as it moves in the main scan direction is subjected to the quantization processing beginning with a pixel at one end of the line and proceeding toward a pixel at the other end. After one line of pixels has been quantized, the next line of pixels adjoining the first line in the subscan direction is similarly subjected to the quantization processing. This process is repeated until image data of the entire image is quantized. Quantization errors that occur during the quantization processing may be distributed to other pixels on the same line as the pixel being quantized or to those on lines adjoining the line of interest in the subscan direction. For example, as shown in FIG. 12, those pixels, to which the quantization errors of the pixel P currently being quantized are to be spread, can be chosen from all or part of unprocessed pixels A, B, H, I on the same line L1 as the pixel of interest P and from pixels C, D, E, F, G on the adjacent line L2. In that case, the error data to be distributed to the pixels on the same line L1 are temporarily stored in a buffer in an error diffusion circuit until these pixels are processed. The error data to be distributed to the pixels on the adjoining line L2 are all stored in an error memory and, when the adjoining line L2 is subjected to the quantization processing, are read out from the error memory for the processing of pixels on the adjoining line L2.

The image data handled by the printing apparatus has increased in volume over the past years because of an enhanced resolution of printed images and an increase in size of the print paper. Further, enhanced functions of a printer engine and an increased size of a print head in the printing apparatus have contributed to the realization of faster printing speeds. All this in turn calls for a capability of processing a large volume of print data at faster speed and especially makes it necessary to increase the speed at which the error diffusion-based quantization processing is performed.

Japanese Patent Laid-Open No. 2001-285633 discloses an image processing apparatus which, in writing error data in an error memory, reduces the number of memory accesses by reducing the number of bits in the error data according to a function approximating a sigmoid function.

With the above conventional image processing apparatus, however, the original error data cannot be recovered from the modified error data with a reduced number of bits, giving rise to a problem of degraded image quality.

SUMMARY OF THE INVENTION

The present invention provides an image processing apparatus, a printing apparatus and an image processing method capable of performing error diffusion-based quantization processing on image data at high speeds while avoiding degradations of image quality of printed images.

In the first aspect of the present invention, there is provided an image processing apparatus which, in performing quantization processing on image data representing a gradation value of each pixel, uses an error diffusion method that distributes error data of a pixel of interest to neighboring pixels around the pixel of interest, the apparatus comprising: a first conversion unit that, when an error value represented by the error data is a particular value, converts the error data into compressed error data with a data volume less than that of the original error data; and a first recovering unit that recovers the original error data representing the particular error value from the compressed error data.

In the second aspect of the present invention, there is provided a printing apparatus which, in performing quantization processing on image data representing a gradation value of each pixel, uses an error diffusion method that distributes error data of a pixel of interest to neighboring pixels around the pixel of interest, and which prints an image according to the image data that has been quantized based on the error diffusion method, the apparatus comprising: a first conversion unit that, when an error value represented by the error data is a particular value, converts the error data into compressed error data with a data volume less than that of the original error data; and a first recovering unit that recovers the original error data representing the particular error value from the compressed error data.

In the third aspect of the present invention, there is provided an image processing method which, in performing quantization processing on image data representing a grayscale level of each pixel, uses an error diffusion method that distributes error data of a pixel of interest to neighboring pixels around the pixel of interest, the method comprising: a first conversion step of, when an error value represented by the error data is a particular value, converting the error data into compressed error data with a data volume less than that of the original error data; and a first recovering step of recovering the original error data representing the particular error value from the compressed error data.

In the fourth aspect of the present invention, there is provided a program having program codes to make a computer execute the image processing method mentioned above.

In the fifth aspect of the present invention, there is provided a storage medium readable by a computer and containing the program mentioned above.

The present invention transforms error data, when an error value represented by the error data is a particular value, into compressed error data smaller in data volume than the original error data. Compressing the error data in connection with the particular value allows the error data to be compressed such that it can be recovered completely, thus avoiding a degradation of quality of printed images and making it possible to perform the error diffusion-based quantization processing on image data at high speeds. More specifically, the speed of the quantization processing can be enhanced by reducing the number of times that the error data is stored in the error memory and the number of times that the error memory is accessed for reading error data.

The speed of the quantization processing can further be enhanced by setting the particular value to an error value whose frequency of appearance increases according to a kind of printed image (e.g., zero) and by compressing the error data representing an error value having a high appearance frequency. It is desired that the particular value be set to an error value with a highest or relatively high appearance frequency. The compressed error data is preferably a 1-bit identifier, for example.

Further features of the present invention will become apparent from the following description of exemplary embodiments (with reference to the attached drawings)

DESCRIPTION OF THE EMBODIMENTS

Now a preferred embodiment of a printing apparatus according to the present invention will be described by referring to the accompanying drawings.

Figure 11:
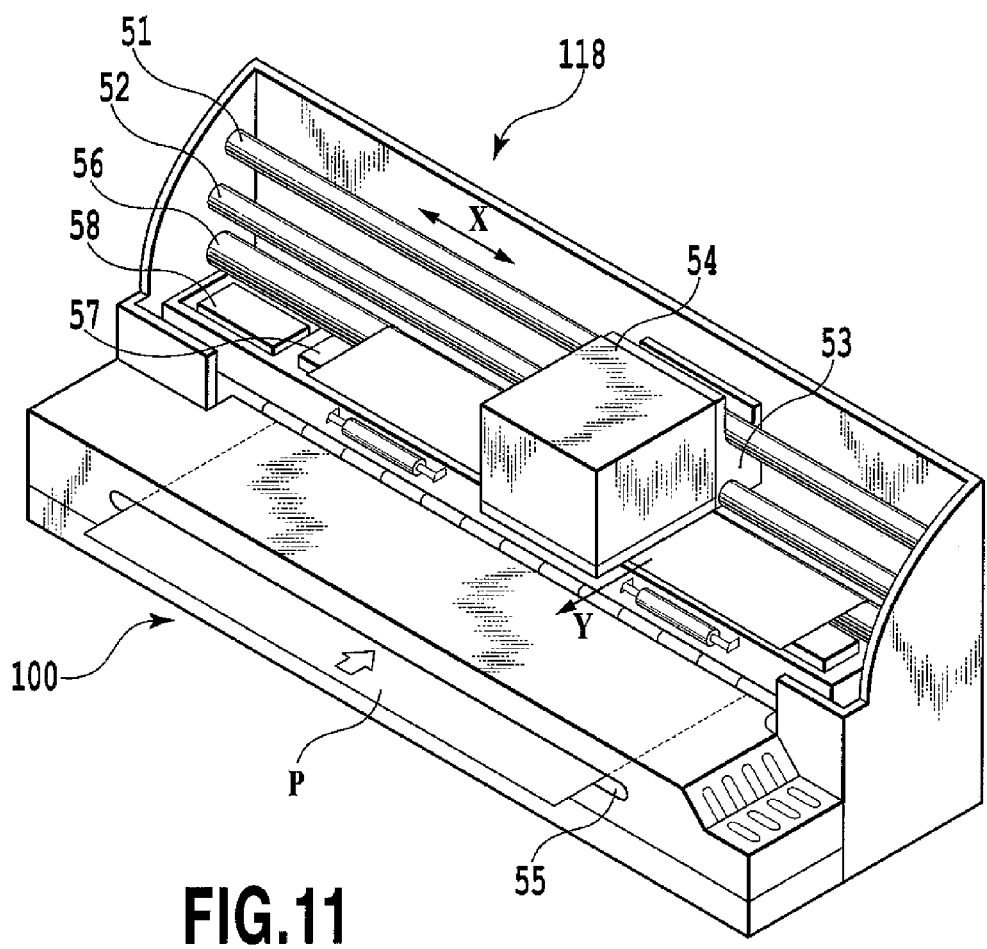
FIG. 11 is a schematic perspective view of a printing apparatus that can apply the present invention.

FIG. 11 is a schematic perspective view showing a printer engine 118 in the ink jet printing apparatus 100 that can apply the present invention.

The printing apparatus 100 of this example is a serial scan type printing apparatus and has a carriage 53 guided on guide shafts 51, 52 so as to be movable in a main scan direction indicated by X. The carriage 53 is reciprocally moved in the main scan direction by a carriage motor and a drive force transmission mechanism such as a belt. The carriage 53 mounts a print head and an ink tank for supplying ink to the print head. In this example, the print head and the ink tank constitute an ink jet cartridge 54. The print head has ink ejection openings arrayed in a direction crossing the main scan direction to form a nozzle array. As a means for ejecting ink from ejection openings, an electrothermal converter (heater) or piezoelectric element may be used. When a heater is used, heat from the heater produces a bubble in ink and a pressure generated by the bubble as it grows is used to eject ink from the ejection opening.

Paper P as a print medium, after being inserted from an insertion opening 55 provided at a front end of the apparatus, is reversed in its transport direction and then fed in a subscan direction of arrow Y by a feed roller 56. The printing apparatus 100 repetitively alternates a printing operation, which involves ejecting ink toward a print area of the paper P on a platen 57 as the print head is moved in the main scan direction, and a transport operation, which involves feeding the paper P a distance corresponding to the print width of the print head in the subscan direction. As a result, an image is formed progressively on the paper P.

At the left end of a stroke of the carriage 53 in FIG. 11, a recovery unit (recovery operation means) 58 is provided which faces an ejection opening forming surface, on which the ejection openings are formed, of the print head mounted on the carriage 53. The recovery unit 58 includes a cap capable of capping the ejection openings of the print head and a suction pump capable of introducing a negative pressure into the cap. By introducing a negative pressure into the cap, that covers the ejection openings, to suck out the ink from the ejection openings, a recovery operation (suction-based recovery operation) is performed to maintain a good ink ejection state of the print head. It is also possible to perform another recovery operation (ejection-based recovery operation) by causing the print head to eject ink that does not contribute to image printing from ejection openings toward the inside of the cap, thereby maintaining the good ink ejection state of the print head.

Figure 1:
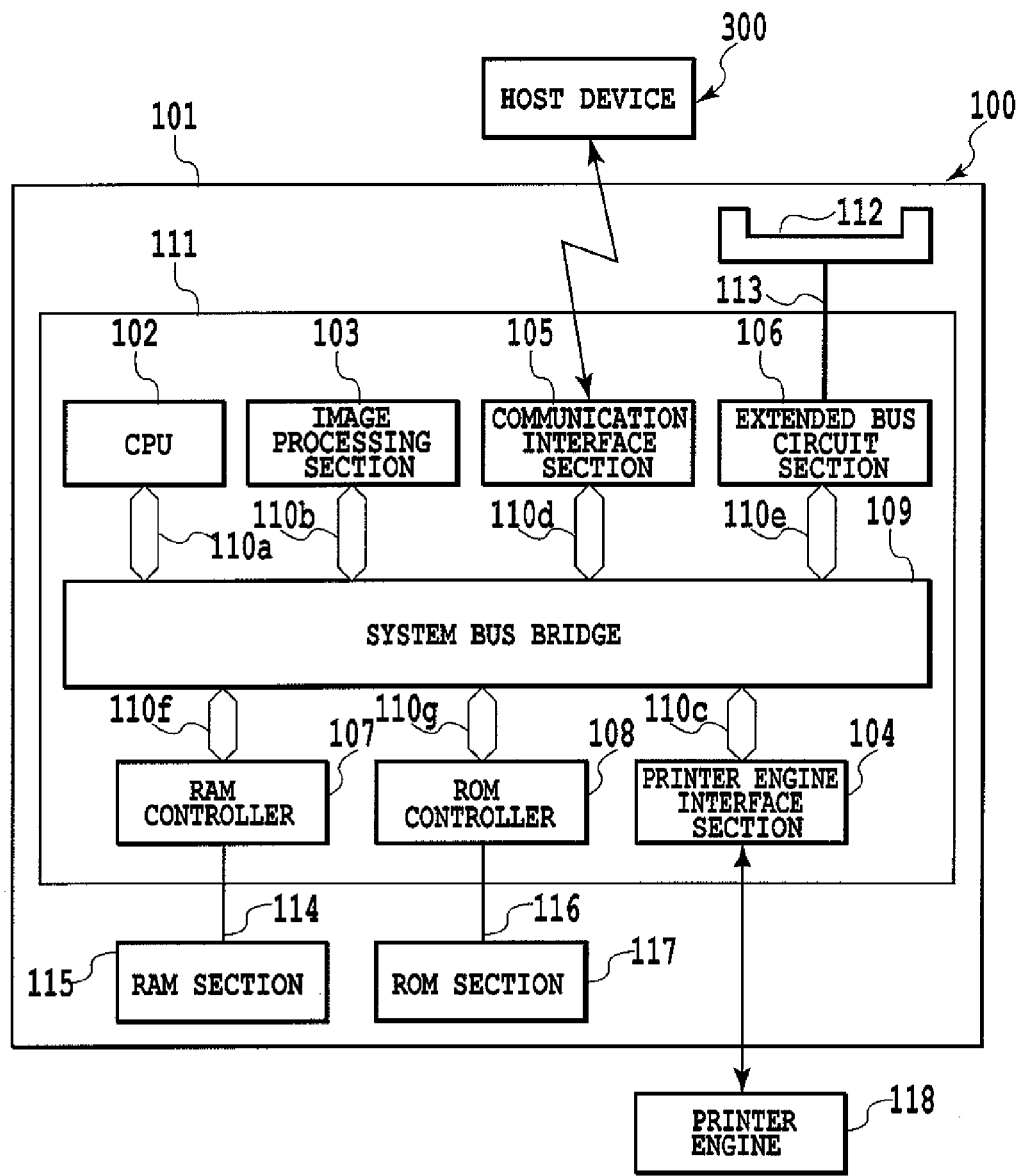
FIG. 1 is a block diagram showing a configuration of a printing apparatus according to a first embodiment of this invention.

FIG. 1 is a block diagram showing a configuration of a control system for the printing apparatus 100. The printing apparatus 100 of this example includes an image forming controller 101 and the printer engine 118.

The image forming controller 101 receives from a host device 300 such as a personal computer a print command and image data to be printed and converts the received image data into binary image data that can be printed by the printer engine 118. The binary image data is output from the image forming controller 110. The image forming controller 101 includes a CPU 102, an image processing section 103, a printer engine interface section 104, a communication interface section 105, an extended bus circuit section 106, a RAM controller 107 and a ROM controller 108. Further, these functional sections (or simply blocks) are connected to a system bus bridge 109 via buslines 110a-110g respectively. In this example, these blocks are configured as an image forming controller ASIC (Application Specific Integrated Circuit) 111.

The image forming controller 101 also includes an expansion slot 112 for accommodating function extension sections, a RAM section 115 and a ROM section 117, as well as an operation section, a display section and a power supply section, the last three not shown.

The CPU 102 controls the entire image forming controller 101. The CPU 102 reads a program stored in the ROM section 117 or RAM section 115 and executes control according to instructions of the program. The CPU 102 thus controls the image processing section 103 to transform the image data received from the host device into image forming data as the binary image data. The CPU 102 also controls the communication interface section 105 and the printer engine interface section 104. The communication interface section 105 communicates with the host device. The printer engine interface section 104 interprets a communication protocol and transfers the binary image data generated by the image processing section 103 to the printer engine 118.

The image processing section 103 has a function of converting the image data it has received from the host device into binary image data that can be printed by the printer engine 118. A detailed construction of the image processing section 103 will be described later.

The printer engine interface section 104 transfers data between the image forming controller 101 and the printer engine 118. The printer engine interface section 104 has a DMAC (Dynamic Memory Access Controller). The printer engine interface section 104 has a function of successively reading through the RAM controller 107 the binary image data generated by the image processing section 103 and stored in the RAM section 115 and transferring it to the printer engine 118.

The communication interface section 105 has a function of transferring data between the host device such as personal computer and work station and the printing apparatus 100. The communication interface section 105 also has a function of storing the image data received from the host device 300 in the RAM section 115 through the RAM controller 107. A communication system of the communication interface section 105 may be a fast serial communication, such as USB (Universal Serial Bus) and IEEE 1394, or a parallel communication such as IEEE 1284. It may also be a network communication, such as 100BASE-TX, or use a combination of these. Further, the communication system is not limited to a wired system and may employ a wireless system.

The extended bus circuit section 106 has a function of controlling the function extension units installed in the expansion slot 112, i.e., controlling the transmission of data to the function extension units through the extension bus 113 and the reception of data output from the function extension units. The expansion slot 112 can be mounted with communication units and hard disk drive units. The communication units provide a function of communicating with the host device 300 via USB, IEEE 1394, IEEE 1284 or network communication. The hard disk drive units provide a large-capacity storage function.

The image processing section 103, the communication interface section 105 and the extended bus circuit section 106 have a DMAC as does the printer engine interface section 104, and thus have a function of issuing a memory access request.

The RAM controller 107 has a function of controlling the RAM section 115. The RAM section 115 is connected to the image forming controller ASIC 111 through a RAM bus 114. The RAM controller 107 relays data being written or read between the CPU 102 and the blocks having DMAC and the RAM section 115. The RAM controller 107 generates a necessary control signal in response to a read or write request from the CPU 102 and these blocks to realize writing data into or reading data from the RAM section 115.

The ROM section 117 is connected to the image forming controller ASIC 111 through the ROM bus 116, and the ROM controller 108 has a function of controlling the ROM section 117. The ROM controller 108 generates a necessary control signal in response to a read request from the CPU 102. The ROM controller 108 reads a control procedure (program) and data stored in advance in the ROM section 117 and sends them to the CPU 102 through the system bus bridge 109. The ROM section 117 may be constructed of an electrically programmable device such as flash memory. In that case, the ROM controller 108 has a function of rewriting the content of the ROM section 117 by producing a necessary control signal.

The system bus bridge 109 has a function of interconnecting those blocks that make up the image forming controller ASIC 111. The system bus bridge 109 also has a function of arbitrating bus right requests when bus access requests are issued by a plurality of blocks at the same time. There are cases where the CPU 102 and the blocks with DMAC issue requests for access to the RAM section 115 through the RAM controller 107 almost simultaneously. In that case, the system bus bridge 109 properly carries out arbitration according to a priority specified in advance.

The RAM section 115 is constructed of a synchronous DRAM. The RAM section 115 is a memory block that provides a function of storing a control procedure (program) to be executed by the CPU 102, a function of temporarily storing binary image data generated by the image processing section 103 and a function of a work memory for the CPU 102. The RAM section 115 also has a function of temporarily buffering image data that the communication interface section 105 receives from the host device 300. Further, the RAM section 115 has a function of temporarily storing data transferred via the extension bus 113 between the image forming controller ASIC 111 and the function extension units.

The ROM section 117 is constructed of a flash memory and stores a control procedure (program) to be executed by the CPU 102 and parameters necessary for controlling a printing operation. The flash memory is an electrically programmable nonvolatile device capable of rewriting the control procedure and parameters according to a determined sequence.

Each of the circuit blocks has a register for setting an operation mode and others. The CPU 102 can set the operation mode of each circuit block through a register access bus not shown.

Figure 12:
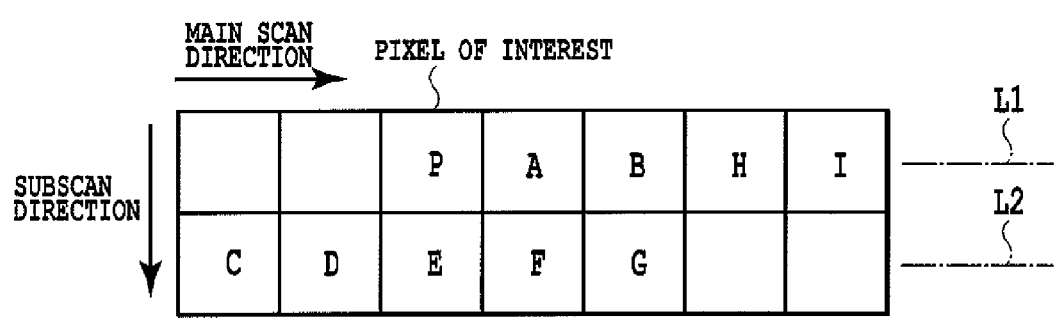
FIG. 12 is an explanatory diagram showing how error data is spread by error diffusion-based quantization processing.

The printer engine 118 is a printing mechanism to print an image on a print medium P according to binary image data supplied from the image forming controller 101. The printer engine 118 of this example uses an ink jet type print head (ink jet print head) to print an image with six color inks—cyan (C), magenta (M), yellow (Y), black (K), light cyan (LC) and light magenta (LM). More specifically, the printer engine 118 repetitively alternates an operation of ejecting these inks from ejection openings of the print head while at the same time moving the print head along with the carriage 53 (see FIG. 12) in the main scan direction and an operation of feeding the print medium P in a subscan direction, thus progressively forming an image on the print medium P. For each of the ink colors, a plurality of ejection openings are arrayed in a direction crossing the main scan direction (in this example, in a direction perpendicular to the main scan direction).

Figure 2:
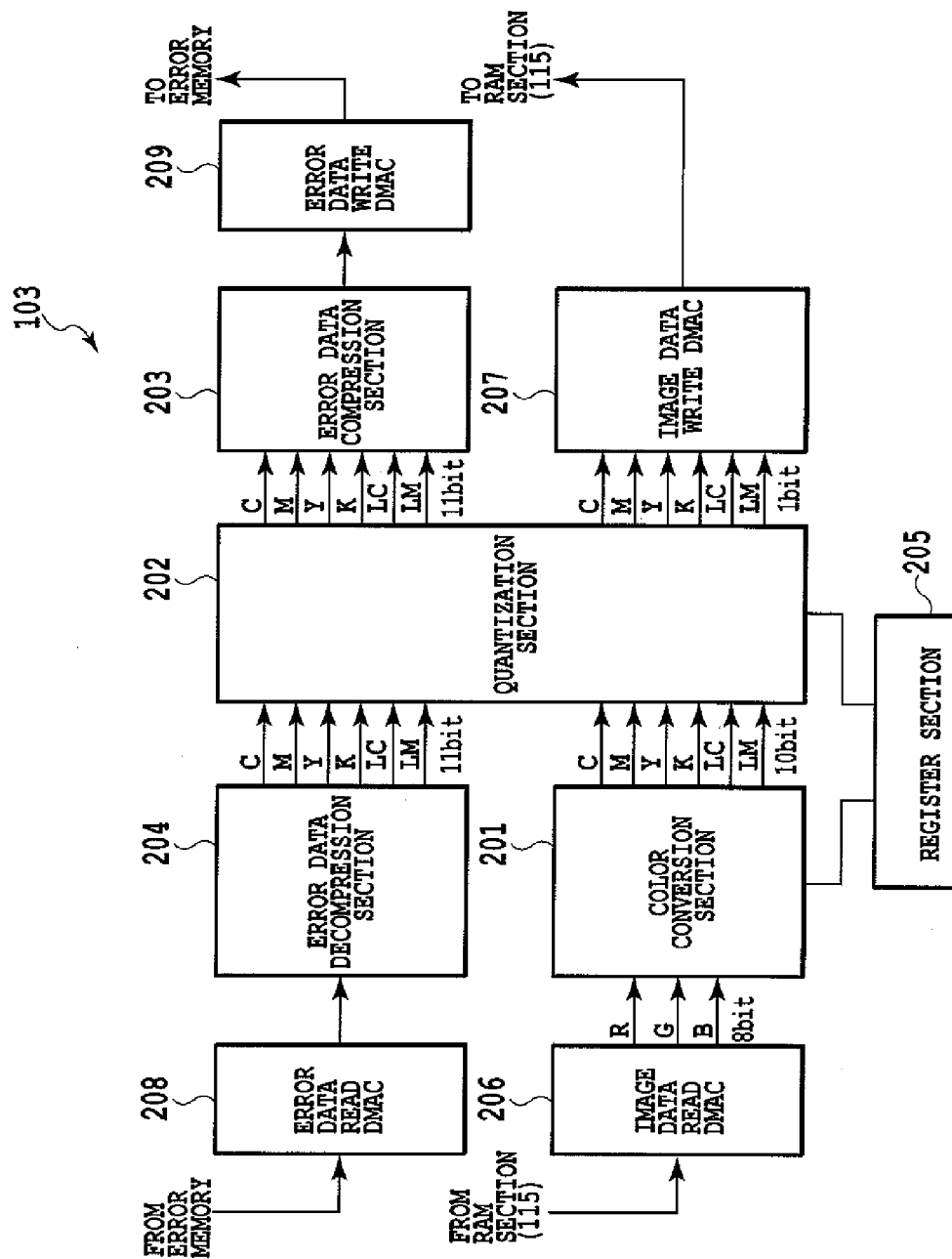
FIG. 2 is a block diagram of an image processing section in FIG. 1.

FIG. 2 shows a block construction of the image processing section 103 and a format of image data processed by the image processing section 103.

The image processing section 103 includes a color conversion section 201, a quantization section 202, an error data compression section 203, an error data decompression section 204 and a register section 205. The image processing section 103 also includes an image data read DMAC 206, an image data write DMAC 207, an error data read DMAC 208 and an error data write DMAC 209.

The color conversion section 201 transforms a color space of input image data received from the host device 300 into a color space represented by ink colors used by the printer engine 118. In this example, individual pixels are each represented by 8-bit image data in the host device 300 for each color of red (R), green (G) and blue (B). The color conversion section 201 transforms the color space of this 8-bit image data into a color space that represents individual pixels with 10-bit data for each of the ink colors (C, M, Y, K, LC and LM). The color conversion section 201 also performs a gamma correction according to output characteristics of the printer engine 118.

The quantization section 202 has a function of performing the error diffusion-based binarization on individual pixels for each ink color. The quantization section 202 performs the binarization, i.e., quantization, by adding up quantization errors spread to a pixel of interest from its neighboring pixels and then comparing the sum with a threshold for that pixel. A quantization error produced in the pixel of interest, on the other hand, is distributed to unprocessed neighboring pixels. This process allows an overall density value of image data to be preserved.

The quantization error to be spread to the unprocessed neighboring pixels by the quantization section 202 is referred to as "error to be diffused" or "error data". The error data compression section 203 has a function of compressing a volume of the error data to be spread to an adjoining line of pixels. The compressed error data is sent to the error data write DMAC (writing means) 209 which stores it in the error memory (memory means). The method of compressing the error data will be described later.

The error data decompression section 204 has a function of expanding the error data, which was compressed by the error data compression section 203, to its original size. The error data decompression section 204 receives the compressed error data through the error data read DMAC 208, decompresses it and sends the decompressed error data to the quantization section 202.

Figure 3A:
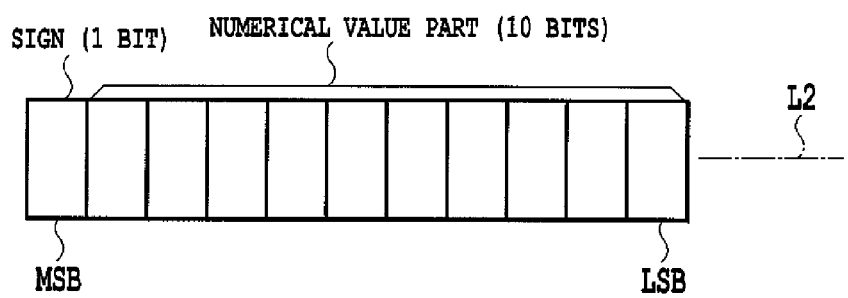
FIGS. 3A, 3B and 3C are explanatory diagrams each showing a format of diffused error data, handled by the printing apparatus of FIG. 1.
Figure 3B:
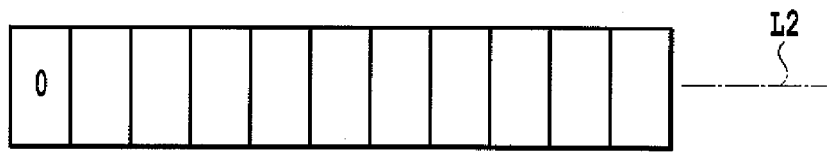
Figure 3C:
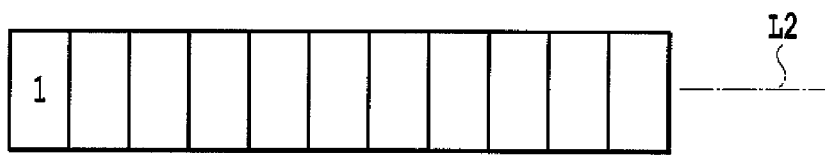

In this example, the error data to be distributed to the adjoining line L2 is represented by 11 bits, including one bit indicating a positive or negative sign, for any of the ink colors as shown in FIG. 3A. A negative number is represented by a complement of 2. Positive error data has "0" in the most significant bit (MSB), as shown in FIG. 3B. Negative error data has "1" in MSB, as shown in FIG. 3C.

The register section 205 includes an image processing start register to instruct the start of the image processing and a command parameter register to specify the content and parameters of the image processing to be executed. The register section 205 also has a register in which to set parameters for compression and decompression operations.

The image data read DMAC 206 is a DMAC to read input image data stored in the RAM section 115. The image data write DMAC 207 is a DMAC to store in the RAM section 115 binary image data generated by the quantization of the input image data.

The error data read DMAC 208 is a DMAC to read from the error memory the error data to be spread from adjoining lines. The error memory is capable of storing the error data including compression error data. The error data write DMAC 209 is a DMAC to store in the error memory the error data to be spread to the adjoining line. The error memory in this example is constructed as part of the RAM section 115.

Next, the operation of the quantization section 202 will be explained.

The quantization section 202 reads the error data that is to be spread from a line of pixels immediately preceding a current line containing a pixel of interest (hereinafter referred to simply as a preceding line). Then an error value represented by the error data is added to a gradation value represented by the image data of the pixel of interest output from the color conversion section 201. The error data to be spread from the preceding line has been compressed by the error data compression section 203 and stored in the RAM section 115. The error data read from the RAM section 115 is decompressed by the error data decompression section 204 to recover its original form before being sent to the quantization section 202. Error data to be distributed from processed pixels in the same line that contains the pixel of interest (referred to simply as "the same line") is also added to the gradation value of the pixel of interest. The error data to be distributed from the pixels of the same line is temporarily stored in a buffer, not shown, in the quantization section 202. After the error data from the pixels in the same line and the preceding line are spread to the pixel of interest, the image data of the pixel of interest is compared with a threshold for each color and then quantized. The quantized binary print data is stored in the RAM section 115 by the image data write DMAC 207. The quantization is performed for each line of pixels.

Figure 4:
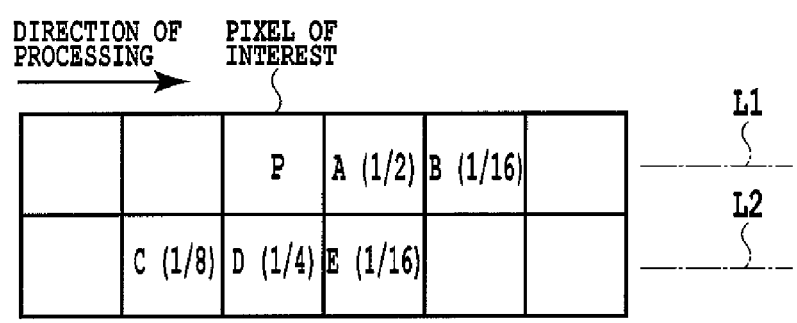
FIG. 4 is an explanatory diagram showing diffusion coefficients for quantization processing in the printing apparatus of FIG. 1.

The quantization error of the pixel of interest "P" that occurs in the quantization processing is spread to unprocessed neighboring pixels according to diffusion coefficients shown in FIG. 4. The error data to be spread to pixel "A" and pixel "B" on the same line L1 is stored in a buffer, not shown, in the quantization section 202. The error data to be spread to pixel "C", "D" and "E" on the next line L2 is temporarily stored in the buffer of the quantization section 202 where all error data to be spread to the same pixel are added up. The summed error data is compressed by the error data compression section 203 before being stored in the RAM section 115 through the error data write DMAC 209.

Figure 5A:
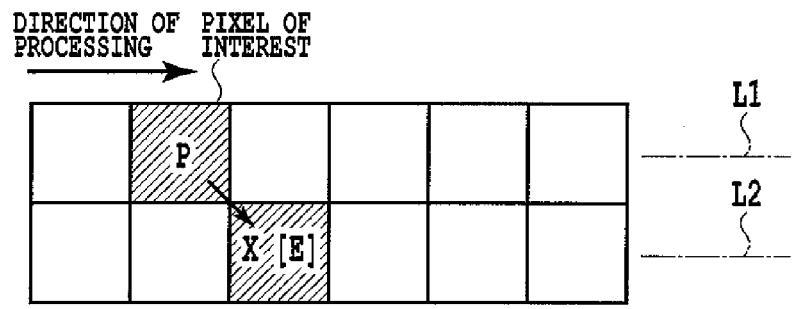
FIGS. 5A, 5B and 5C are explanatory diagrams showing a method of summing up errors spread to neighboring lines in the printing apparatus of FIG. 1.
Figure 5B:
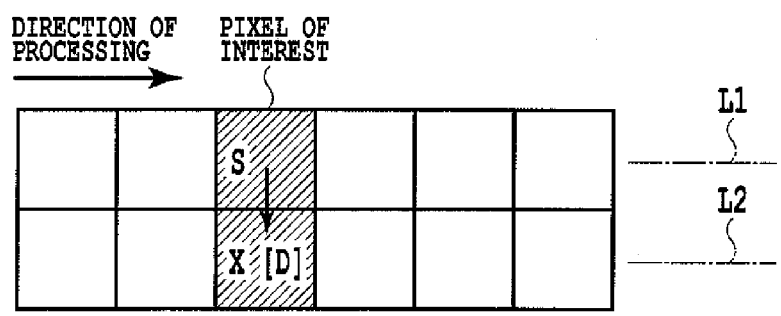
Figure 5C:
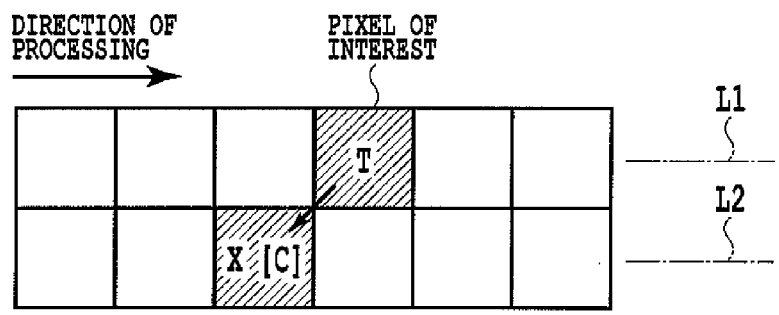

The error data to be spread to a pixel "X" on the adjoining line L2 in FIG. 5A is a sum of three pieces of error data—first, second and third error data. The first error data is error data to be spread from the pixel of interest "P" in FIG. 5A according to a diffusion coefficient (1/16) of pixel "E" in FIG. 4. The second error data is error data to be spread from the pixel of interest "S" in FIG. 5B according to a diffusion coefficient (1/4) of pixel "D" in FIG. 4. The third error data is error data to be spread from the pixel of interest "T" in FIG. 5C according to a diffusion coefficient (1/8) of pixel "C" in FIG. 4.

When the start of the image processing is instructed by the CPU 102 writing into the register section 205, the image processing section 103 successively reads the input image data from the RAM section 115 for those pixels ranging from one end of the line to the other end, and performs the color conversion processing and the quantization processing on the image data. The image processing section 103, when this series of processing (also referred to as "line processing") is completed, issues an interrupt to the CPU 102 to notify it of the completion of the line processing. Upon receiving another instruction from the CPU 102, the image processing section 103 executes the similar line processing on the next line of pixels adjoining the previous line in the subscan direction, thus realizing the binarization for the entire image data. The binarized image data (output image data) is stored successively in the RAM section 115, from which it is transferred by the printer engine interface section 104 to the printer engine 118 that prints an image on a print medium P according to the image data.

Next, the operation of the printing apparatus in this example will be explained.

Figure 6:
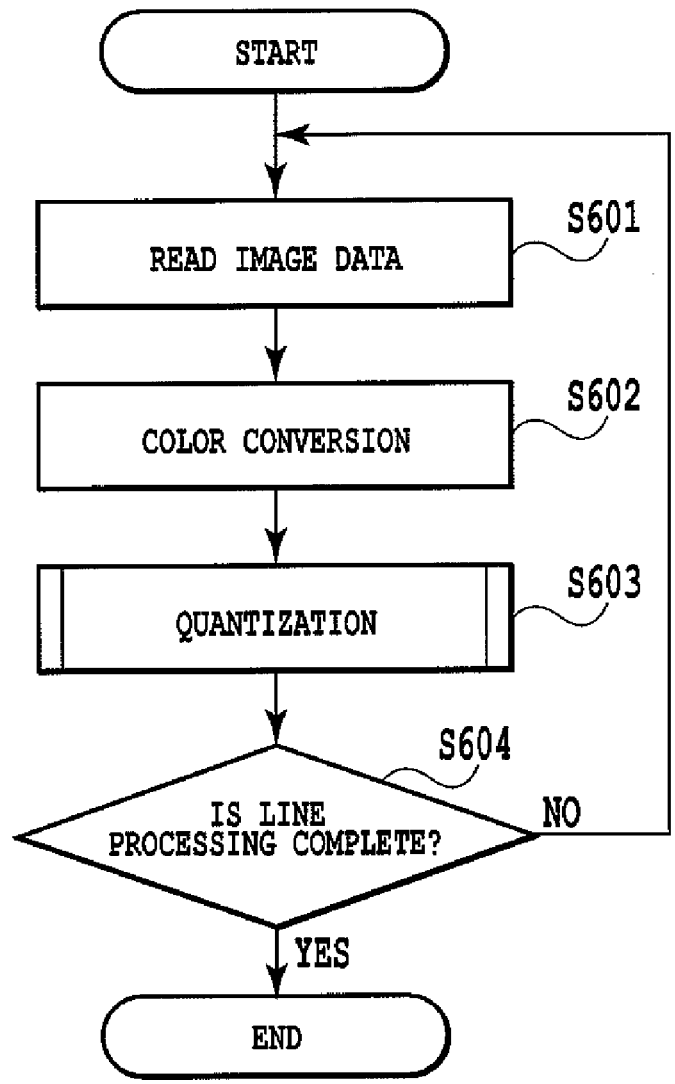
FIG. 6 is a flow chart showing image processing including the quantization, performed by the printing apparatus of FIG. 1.

FIG. 6 is a flow chart showing a series of operations performed by the image processing section 103 in quantizing the input image data. The image processing section 103, when the execution of the quantization processing is instructed, performs the image processing according to the flow chart of FIG. 6 to execute the quantization processing.

That is, the image processing section 103 at step S601 reads the image data for the pixel of interest from the RAM section 115 through the image data read DMAC 206 and then moves to step S602. Next, the image processing section 103 at step S602 converts the image data for the pixel of interest into image data represented by ink colors before proceeding to step S603. This conversion processing is performed by the color conversion section 201. Then, the image processing section 103 at step S603 quantizes the image data for the pixel of interest by the error diffusion method for each of ink colors C, M, Y, K, LC and LM and moves to step S604. This quantization processing will be described later.

Next, the image processing section 103 at step S604 checks if the processing on one line of pixels is finished and, if unprocessed pixels are found remaining, returns to step S601. If all pixels in one line are found processed, this operation is ended.

In this example, the processing shown in the flow chart of FIG. 6 is described in Hardware Description Language (HDL) to perform a logic synthesis to generate logical circuits that can implement the image processing operation. The image processing section 103 is then constructed of the logical circuits.

Next, referring to FIG. 7, a quantization procedure in step S603 of FIG. 6 will be explained.

Figure 7:
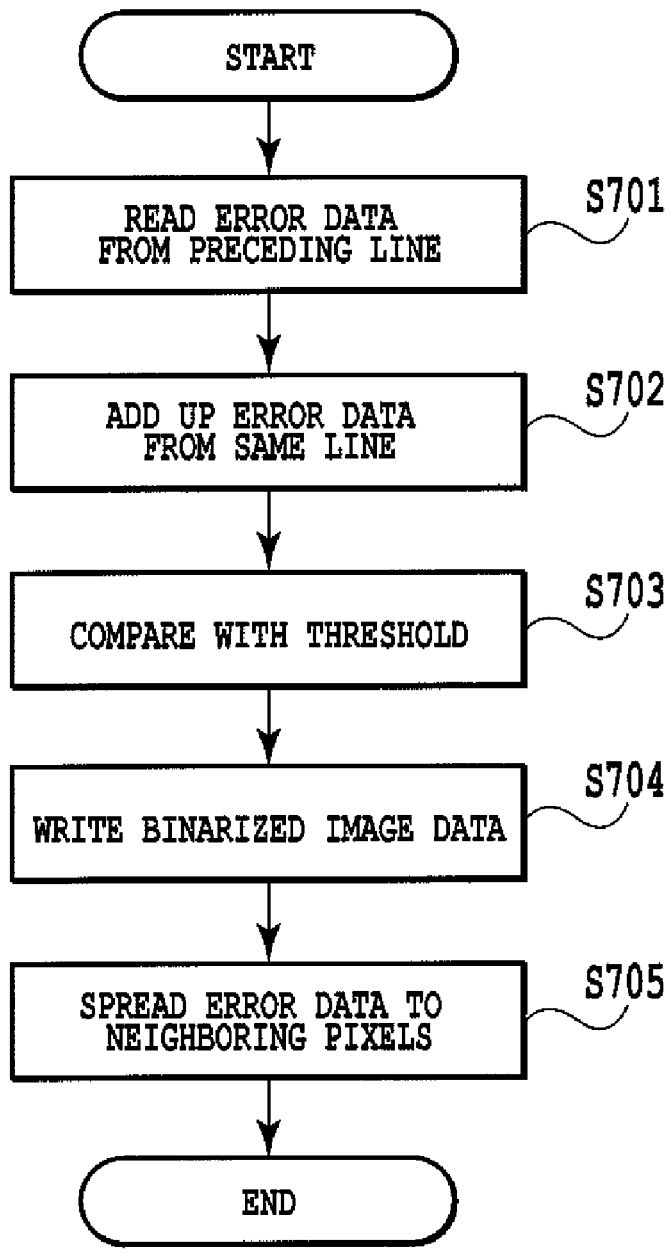
FIG. 7 is a flow chart showing the quantization processing of FIG. 6.

First, the image processing section 103 at step S701 of FIG. 7 reads through the error data read DMAC 208 diffusion errors for the pixels on the preceding line that have been compressed and stored in the RAM section 115. The diffusion errors for the pixels on the preceding line are error data to be spread from a line immediately preceding the current line being processed to the image data for the current line. The error data thus read out is decompressed by the error data decompression section 204 and added to the image data for the current line.

The image processing section 103 at the next step S702 adds to the image data for the current line the diffusion error stored in the quantization section 202, i.e., the error data to be spread from the pixels on the same current line, and then moves to step S703. At step S703 the image processing section 103 compares the image data, to which the error data to be spread from the neighboring pixels is added, with a threshold stored in a register not shown to generate binary image data. At step S704 the image processing section 103 writes the generated binary image data into the RAM section 115 through the image data write DMAC 207. At step S705, the image processing section 103 spreads the quantization errors to neighboring pixels that have yet to be quantized according to the diffusion coefficients shown in FIG. 4. Then, this processing is ended. Of the error data to be spread by step S705, those spread to pixels on the same line are stored in the buffer in the quantization section 202. The error data to be spread to pixels on the next line are temporarily stored in the buffer as described earlier and, after all error data to be spread to the pixel of interest are summed up, are compressed by the error data compression section 203. The compressed error data is stored in the RAM section 115 through the error data write DMAC 209.

Next, referring to the flow chart of FIG. 8, the operation procedure for the error data compression section 203 will be explained.

The error data compression section 203 at step S801 checks if the error data received from the quantization section 202 is "0". If the error data is found to be "0", the processing moves to step S802. If not, it moves to step S803. When the error data is determined as being "0", the error data compression section 203 at step S802 replaces the error data with a 1-bit identifier "0", thus compressing the error data into 1-bit data as detailed later by referring to an example. After this, the processing proceeds to step S804. If, on the other hand, the error data is found to be not "0", the error data compression section 203 at step S803 attaches an identifier "1" to a combination of the sign bit (1 bit) and the numerical value part (10 bits) of the error data. As a result, the error data becomes 12-bit data as described later by referring to an example. After this, the processing moves to step S804.

At step S804 the error data compression section 203 checks if the error data processing on the associated pixels is completed for all colors C, M, Y, K, LC and LM. If unprocessed pixels are found remaining, the error data compression section 203 returns to step S801. If the error data processing on the pixels is found completed for all colors, it moves to step S805. At step S805, the error data compression section 203 combines the error data of the processed pixels for all colors and stores the series of error data into the RAM section 115 through the error data write DMAC 209, before ending this procedure.

Figure 8:
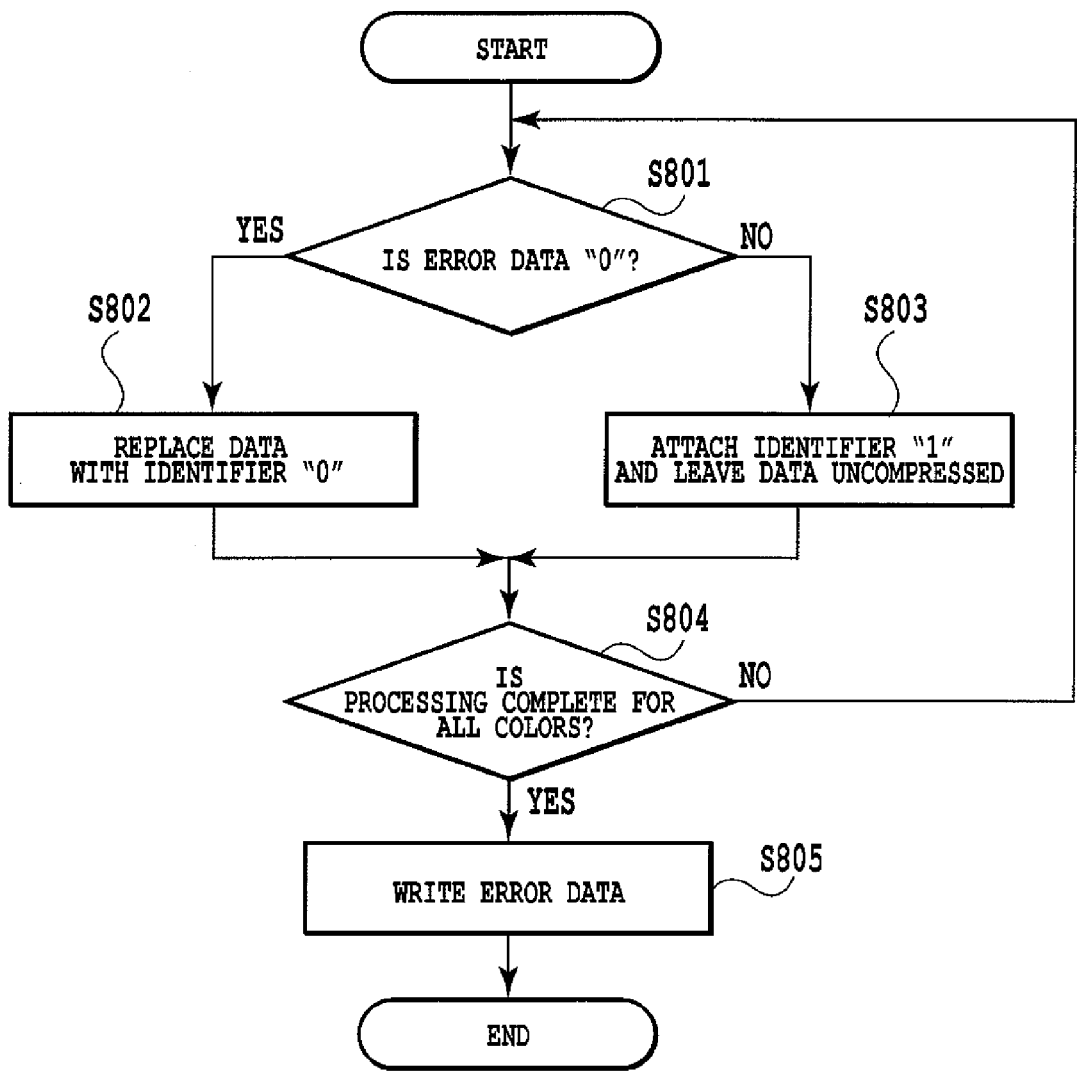
FIG. 8 is a flow chart showing a process of compressing error data in the quantization processing of FIG. 6.

As described above, the error data can be compressed by following the sequence of steps in the flow chart of FIG. 8.

Figure 9A:
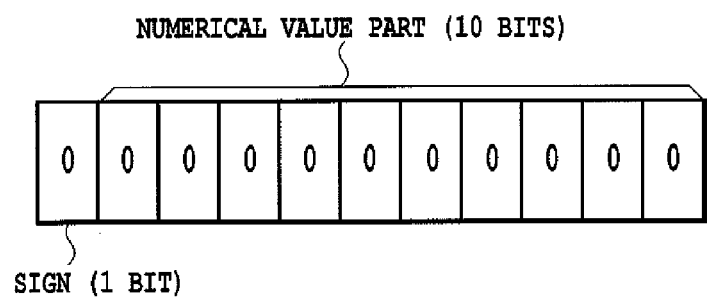
FIGS. 9A, 9B and 9C are explanatory diagrams showing error data each having a positive sign bit before being subjected to the error data compression processing of FIG. 8.
Figure 9B:
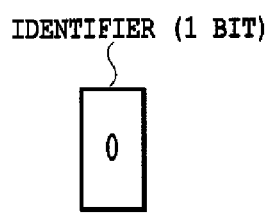
Figure 9C:
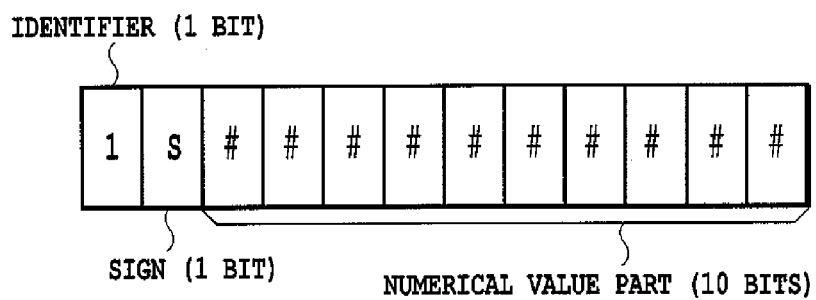

For example, error data shown in FIG. 9A, "00000000000", is converted into a 1-bit identifier "0" shown in FIG. 9B, i.e., its information volume is compressed. If the error data is not "00000000000", a 1-bit identifier "1" is attached to the original 11-bit error data to convert it into 12-bit data as shown in FIG. 9C. Thus, as the number of pieces of the "00000000000" data contained in the error data increases, the information volume of the error data decreases, thus making it possible to reduce the number of accesses to the RAM section 115.

Next, referring to the flow chart of FIG. 10, an operation procedure for the error data decompression section 204 to decompress the compressed diffusion error data will be explained.

The error data decompression section 204 at step S1001 checks if a 1-bit identifier at the head of the compressed error data read from the RAM section through the error data read DMAC 208 is "0". If so, the processing moves to step S1002. If the identifier is "1", the processing moves to step S1003.

At step S1002 the error data decompression section 204 converts the 1-bit identifier "0" into 11-bit error data "00000000000" before proceeding to step S1004. In this step S1002 the compressed error data of FIG. 9B is decompressed to recover the original 11-bit error data, such as shown in FIG. 9A.

If the identifier is "1", the error data decompression section 204 at step S1003 eliminates the 1-bit identifier at the head of the error data to recover the 11-bit error data before proceeding to step S1004. In this step S1003, the identifier is removed from the data of a format shown in FIG. 9C, resulting in 11-bit error data comprised of a sign bit and a 10-bit numerical value part being recovered.

At step S1004 the error data decompression section 204 checks if the decompression processing on the associated pixels is completed for all colors C, M, Y, K, LC and LM. If unprocessed pixels are found remaining, the processing returns to step S1001. If the decompression processing on the pixels is found completed for all colors, it moves to step S1005. At step S1005, the error data decompression section 204 transfers the decompressed error data of the processed pixels for all colors to the quantization section 202, before ending this procedure.

Figure 10:
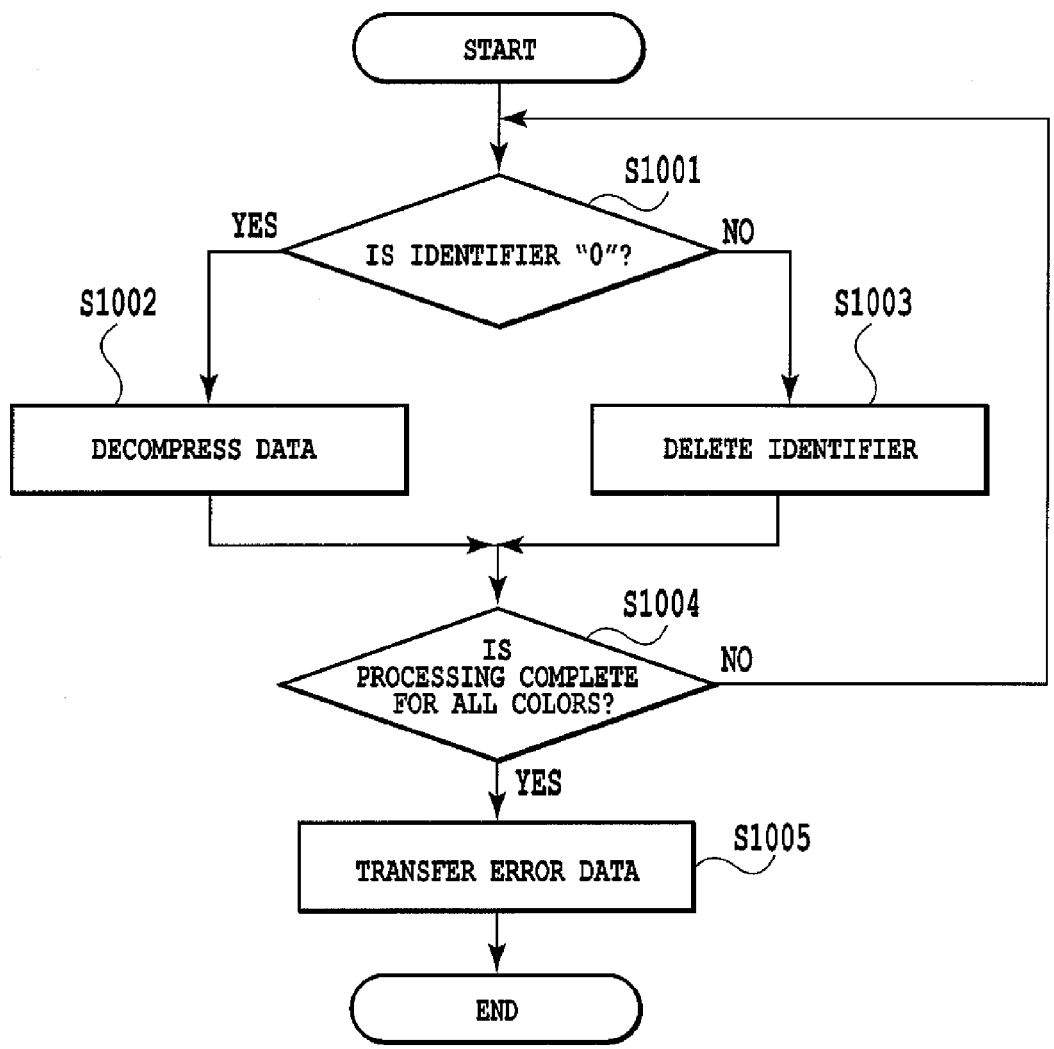
FIG. 10 is a flow chart showing a process of recovering error data, performed by the printing apparatus of FIG. 1.

In this example, the processing such as shown in the flow charts of FIGS. 7, 8 and 10 is described in hardware description language to perform a logic synthesis to generate logic circuits capable of compression and decompression of error data and thereby build the image processing section. In that case, a synchronous circuit can be created that allows for simultaneous execution of the processing on pixels for each of the colors. It is also possible to describe the flow charts of FIGS. 6-8 and FIG. 11 using a state machine and to generate a circuit to execute the processing on pixels in sequence for each color.

Other Embodiments

In the preceding embodiments the operation of binarizing image data by the quantization processing has been explained. The present invention, however, is not limited to this method but can of course construct a printing apparatus employing a multivalued error diffusion method that quantizes image data using three or more gradation values. In that case binary image data can be generated by combining the multivalued error diffusion method-based quantization and a density pattern method.

The present invention, when an error value of error data is a particular value, needs only to be able to transform the error data into compressed error data with a data volume less than that of the original error data and then recover from the compressed error data the original error data representing that particular error value. When the error value of error data is not the particular value, the error data is simply attached with an identifier and then the original error data representing the error value not identical with the particular value can be recovered by removing the identifier from the error data. In the above embodiments, a construction has been described in which the CPU and circuit blocks are sealed in one package and built as a system LSI. This invention, however, is not limited to this construction and a part or all of the circuit blocks may be constructed in separate ICs.

In the above embodiments, explanations have been given to a case where a content described in hardware description language is logically synthesized to generate logic circuits which are then used to execute quantization processing. This invention is not limited to this configuration. For example, a storage medium containing software programs implementing the above-described function of the embodiments may be loaded into an apparatus so that the apparatus or computer CPU can read the programs stored in the storage medium and then execute them to perform the quantization processing. In this case, the programs themselves, which are read from the storage medium, implement the function of the embodiments. Among possible storage media that may be used to supply programs are, for example, flexible disks, hard disks, optical discs, magnetooptical discs, CD-ROMs, CD-Rs, magnetic tapes, nonvolatile memory cards and ROMs. The function of the above embodiments may also be realized by having an operating system (OS) running on a computer execute a part or all of actual processing according to instructions of the program read out by the computer.

(Others)

The present invention is also applicable to an image processing apparatus and an image processing method, which, in quantizing image data representing a gradation value of each pixel, use an error diffusion method that spreads error data of a pixel of interest to neighboring pixels around the pixel of interest. The image processing apparatus may be integrally built into a printing apparatus 100 as in the preceding embodiments or constructed in a host device 300.

The present invention needs only to be able to quantize image data by an error diffusion method so as to reduce the number of gradation values of each pixel that are represented by image data. Thus, there need only to be three or more gradation values for image data before the quantization processing. After the quantization processing, the number of gradation values required for the image data is smaller than that before the quantization processing and needs only to be two or more.

The present invention does not limit in any way the method for printing an image according to the quantized image data. Thus, the printing method may be other than the above-mentioned ink jet printing method. The invention also does not limit in any way the construction of the printing apparatus that implements the printing method.

Further, the present invention, when an error value of error data is a particular value, needs only to be able to transform the error data into compressed error data with a data volume less than that of the original error data. The particular value is not limited only to zero as it has been in the preceding embodiments but may be set to a desired value. For example, the particular value may be set to an error value whose frequency of appearance increases according to a kind of printed image. This allows error data representing an error value with a high appearance frequency to be compressed, further increasing the speed of the quantization processing. It is desired that the particular value be set to an error value with a highest or relatively high appearance frequency. The compressed error data needs only to be smaller in data volume than the original error data and is not limited only to the 1-bit identifier used in the preceding embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-331000, filed Dec. 7, 2006, which is hereby incorporated by reference herein in its entirety.

What is claimed is:

1. An image processing apparatus which, in performing quantization processing on image data representing a gradation value of each pixel, uses an error diffusion method that distributes error data of a pixel of interest to neighboring pixels around the pixel of interest, the error data being generated by quantizing the pixel of interest, the apparatus comprising:
   a first conversion unit that, when an error value represented by the error data is a particular value, converts the error data into compressed error data with a data volume less than that of the original error data;
   a first recovering unit that recovers the original error data representing the particular error value from the compressed error data;
   a second conversion unit that, when an error value represented by the error data is not the particular value, attaches a second identifier to the error data; and
   a second recovering unit that recovers the error data representing the error value other than the particular error value by removing the second identifier from the error data that has been attached with the second identifier.

2. The image processing apparatus according to claim 1, wherein the particular value is zero.

3. The image processing apparatus according to claim 1, wherein the compressed error data is a 1-bit first identifier.

4. The image processing apparatus according to claim 1, wherein the error value of the error data is expressed by a plurality of bits;
   wherein the first conversion unit, when the error value of the error data is the particular value, converts the error data into 1-bit compressed error data.

5. The image processing apparatus according to claim 1, wherein the error value represented by the error data is a sum of error values represented by each of error data distributed from a plurality of pixels.

6. The image processing apparatus according to claim 1, wherein the quantization processing is performed on each line of a plurality of arrayed pixels;
   wherein the error data is error data that is distributed from a pixel line including the pixel of interest to at least one pixel line adjoining the pixel line including the pixel of interest.

7. The image processing apparatus according to claim 1, wherein the error data including the compressed error data has a sign bit indicating whether the error value is positive or negative.

8. The image processing apparatus according to claim 1, further including:
   a storage unit capable of storing the error data including the compressed error data;
   a write unit capable of writing the error data including the compressed error data into the storage unit; and
   a read unit capable of reading the error data including the compressed error data from the storage unit.

9. The image processing apparatus according to claim 1, further including:
   a correction unit that corrects the image data of the pixel of interest by adding the error value of the error data including the recovered error data to the gradation value of image data of the pixel of interest.

10. A non-transitory storage medium readable by a computer and having program codes stored thereon for controlling the computer to perform an image processing method which, in performing quantization processing on image data representing a gradation value of each pixel, uses an error diffusion process that distributes error data of a pixel of interest to neighboring pixels around the pixel of interest, the error data being generated by quantizing the pixel of interest, the method comprising:
   a first conversion step of, when an error value represented by the error data is a particular value, converting the error data into compressed error data with a data volume less than that of the original error data;
   a first recovering step of recovering the original error data representing the particular error value from the compressed error data;
   a second conversion step that, when an error value represented by the error data is not the particular value, attaches a second identifier to the error data; and
   a second recovering step that recovers the error data representing the error value other than the particular error value by removing the second identifier from the error data that has been attached with the second identifier.

11. A printing apparatus which, in performing quantization processing on image data representing a gradation value of each pixel, uses an error diffusion method that distributes error data of a pixel of interest to neighboring pixels around the pixel of interest, the error data being generated by quantizing the pixel of interest, and which prints an image according to the image data that has been quantized based on the error diffusion method, the apparatus comprising:
   a first conversion unit that, when an error value represented by the error data is a particular value, converts the error data into compressed error data with a data volume less than that of the original error data;
   a first recovering unit that recovers the original error data representing the particular error value from the compressed error data;
   a second conversion unit that, when an error value represented by the error data is not the particular value, attaches a second identifier to the error data; and
   a second recovering unit that recovers the error data representing the error value other than the particular error value by removing the second identifier from the error data that has been attached with the second identifier.

12. An image processing method which, in performing quantization processing on image data representing a gradation value of each pixel, uses an error diffusion process that distributes error data of a pixel of interest to neighboring pixels around the pixel of interest, the error data being generated by quantizing the pixel of interest, the method comprising:
   a first conversion step of, when an error value represented by the error data is a particular value, converting the error data into compressed error data with a data volume less than that of the original error data;
   a first recovering step of recovering the original error data representing the particular error value from the compressed error data;
   a second conversion step that, when an error value represented by the error data is not the particular value, attaches a second identifier to the error data; and
   a second recovering step that recovers the error data representing the error value other than the particular error value by removing the second identifier from the error data that has been attached with the second identifier.

* * * * *